United States Patent
de Haas

(10) Patent No.: US 11,652,617 B1
(45) Date of Patent: May 16, 2023

(54) TWO WAY AUTHENTICATED TIME-OF-FLIGHT

(71) Applicant: Dialog Semiconductor B.V., s-Hertogenbosch (NL)

(72) Inventor: Joek de Haas, Veldhoven (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 479 days.

(21) Appl. No.: 16/448,327

(22) Filed: Jun. 21, 2019

(51) Int. Cl.
*H04L 9/08* (2006.01)
*H04W 76/10* (2018.01)

(52) U.S. Cl.
CPC ............ *H04L 9/0841* (2013.01); *H04L 9/085* (2013.01); *H04W 76/10* (2018.02)

(58) Field of Classification Search
CPC ....... H04L 9/0841; H04L 9/085; H04W 76/10
USPC ........................................................ 713/171
See application file for complete search history.

(56) References Cited

U.S. PATENT DOCUMENTS

| | | | |
|---|---|---|---|
| 8,644,768 B2 | 2/2014 | Kluge et al. | |
| 8,823,577 B2 | 9/2014 | Smid et al. | |
| 9,078,284 B2 * | 7/2015 | Richardson | H04W 88/08 |
| 2016/0021684 A1 * | 1/2016 | Lewis | H04W 12/037 370/329 |
| 2017/0272976 A1 * | 9/2017 | Yang | H04L 27/2603 |
| 2019/0135229 A1 * | 5/2019 | Ledvina | H04W 4/023 |
| 2019/0149996 A1 * | 5/2019 | Koudouridis | H04W 8/24 455/411 |
| 2019/0171465 A1 * | 6/2019 | Benson | H04W 12/0431 |

OTHER PUBLICATIONS

Fotouhi et al. 2016 IEEE 40th Annual Computer Software and Applications Conference, "Communication and Security in Health Monitoring Systems—A Review", pp. 545-554 (Year: 2016).*
Brys et al., 2012 IEEE Military Communications and Information Systems Conference (MCC), "Mechanisms of Ad-hoc networks supporting Network Centric Warfare" (pp. 1-9 (Year: 2012).*

* cited by examiner

*Primary Examiner* — Khalil Naghdali
(74) *Attorney, Agent, or Firm* — Saile Ackerman LLC; Stephen B. Ackerman

(57) ABSTRACT

The present invention discloses a method and a device for performing authenticated ranging measurement by a first radio node. The method comprises receiving a first ranging signal from the second radio node; determining a first ranging parameter based on the first ranging signal; determining a range based on the first ranging parameter; and authenticating the second radio node based on the first ranging signal and authentication setup information comprising a condition on the first ranging signal.

52 Claims, 10 Drawing Sheets

TWO WAY AUTHENTICATED TIME-OF-FLIGHT

FIELD OF THE INVENTION

The invention relates to performing authenticated ranging measurement between two radio devices.

BACKGROUND OF THE INVENTION

Today's radio communication is complex and many current and emerging applications are populating the radio communication, where it is often desirable to locate the radio nodes or to determine the distance between two communicating radio nodes. This is used as the basis for finding location, asset tracking, navigation etc. Different distance measurement or ranging techniques are therefore studied in the literature.

U.S. Pat. No. 8,644,768 B2 discloses a method for distance measurement between two radio nodes. A first unmodulated carrier signal is transmitted by the first radio node and received by the second radio node. A second unmodulated carrier signal is transmitted by the second node and received by the first node. A first value and a second value of a first phase are measured by the first radio node, whereby the first value of the first phase is assigned to first frequency of the received second carrier signal and the second value of the first phase is assigned to a second frequency of the received second carrier signal, whereby the first frequency and the second frequency have a frequency difference. A third value and a fourth value of second phase are measured by the second radio node, whereby the third value of the second phase is assigned to a third frequency of the received first carrier signal and the fourth value of the second phase to a fourth frequency of the received first carrier signal, whereby the third frequency and the fourth frequency have the frequency difference. The distance is determined from the frequency difference from the first value and the second value of the first phase and from the third value and fourth value of the second phase.

U.S. Pat. No. 8,823,577 B2 discloses a distance separation tracking process that includes the transmission of a periodic radio frequency originating signal from a beacon transceiver. The original periodic signal from the beacon transceiver is received at a remote target transceiver as a target received periodic signal. Data points of the return periodic signal are sampled and used to calculate the phase differential between the original periodic signal and the return periodic signal that correlates to the distance separation range between the beacon transceiver and the target transceiver.

SUMMARY OF THE INVENTION

Current ranging solutions operate without embedded security (authentication). However, locating the radio nodes and/or performing ranging measurement is not enough as security in radio communication is one of the major issues. In many cases distance measurement or ranging needs to support secure authenticated radio communication, where authentication normally is based on something a user or device "Knows", "Has", "Is".

It would be desirable to have an improved way of performing authentication between two radio nodes. To better address this concern, a first aspect of the invention provides a method for performing authenticated ranging measurement by a first radio node. The method comprises receiving a first ranging signal from a second radio node, determining a first ranging parameter based on the first ranging signal, determining a range based on the first ranging parameter, and authenticating the second radio node based on the first ranging signal and an authentication setup information comprising a condition on the first ranging signal. The method makes it possible to use ranging in secure applications by embedding an authentication protocol in ranging measurements such that the authentication of a radio node cannot be separated from the time of flight measurement. The above outlined method allows for applying the authentication set up information to the received first ranging signal to check that the received first ranging signal is sent by an authorized second radio node.

In an example, the method may further comprise transmitting a second ranging signal to the second radio node and receiving information indicating a second ranging parameter based on the second ranging signal from the second radio node. The method may determine a range based on the first ranging parameter and the second ranging parameter. This allows for average range calculation, by the first radio node, based on ranging parameters related to both transmitted and received ranging signals.

In an example, the method may further comprise determining authentication information based on the authentication setup information, where the transmitted second ranging signal represents the authentication information. According to these features, the authentication is embedded also in the transmitted second ranging signal, so that the ranging signals are protected in both directions of the communication.

In an example, the method may further comprise communicating at least part of the authentication setup information between the first radio node and the second radio node using a secure communication protocol. This allows for an easy integration of the authenticated ranging measurement method to any protocol supported by the radio nodes by securely transferring at least a part of the authentication setup information at the beginning of the communication between the first radio node and the second radio node using any communication protocol available at the radio node.

In an example, the authentication setup information may comprise a shared secret or a public key. The authentication set up information can be used as a basis for the authentication. This type of authentication setup information allows to implement several methods to verify that the ranging signal is originating from the known source.

The authentication of the second radio node, by the first radio node, may comprise computing a value based on the received first ranging signal and the authentication setup information, determining if the condition is satisfied based on the computed value and authenticating the second radio node if the condition is satisfied. This provides an efficient manner to authenticate the second radio node, at the first radio node. If the second radio node communicating with the first radio node is not the intended node for communication, the value calculated based on the received first ranging signal from the communicating second radio node would have very low probability of satisfying the condition, since the second radio node does not know how to generate the first ranging signal representing the authentication information without knowledge of the authentication setup information.

The method may further comprise extracting a digital message comprised in the received first ranging signal, where the condition on the first ranging signal comprises a condition on the digital message. This allows for checking the authenticity of the second radio node by using a digital message comprised in the received first ranging signal. Hence, a condition may be applied on the extracted digital message from the received first ranging signal to check the authentication of the communicating second radio node. This allows that strong authentication methods such as cryptographic key based methods can be used.

In an example, the method may further comprise transmitting a challenge to the second radio node and receiving the first ranging signal as a response to the challenge from the second radio node. Moreover, if it is determined that the condition is satisfied based on the response to the challenge and a cryptographic key the second radio node may be authenticated. This allows the use of a challenge-response protocol for the authentication to protect the first ranging signal by embedding the response in the first ranging signal.

In an example, the first ranging signal and the second ranging signal may be conveyed in a direct wireless connection in accordance with a standard wireless communications protocol set up between the first radio node and the second radio node. This way there is no interference between the protocol and the ranging signal. The system bandwidth is thus used more efficiently. Also, the implementation of the radio node can be less complex since the ranging signal is transmitted using the standard wireless communications protocol, which may be present to enable other kinds of communications of the radio node anyway.

In an example, receiving the first ranging signal may comprise determining at least one channel parameter of a communications channel based on the authentication setup information, listening to the communications channel having the channel parameter, and receiving the first ranging signal in the channel having the channel parameter. Since the communications channel to be used for the first ranging signal depends on the authentication setup information, an unauthorized radio node that does not possess the authentication setup information is not able to know the communications channel through which to send the first ranging signal. Therefore, if the signal is received in the proper communications channel it is an indication that the second radio node is an authorized radio node.

In an example, the channel parameter may comprise a radio frequency. This is a suitable channel parameter that can be applied to ranging with unmodulated carrier signals relatively easily.

The method may further comprise tuning to a plurality of communications channels according to a sequence of channel parameters and receiving the first ranging signal in each of the plurality of communications channels. This allows for particularly secure authenticated first ranging signals because it is more difficult to know a large number of frequencies, thus making it impossible for the imposter radio node to fake the repetitive measurement process.

In an example, authenticating the second radio node may comprise authenticating the second radio node if the first ranging signal has been successfully received on a certain sufficient number of the plurality of communications channels. This process allows for guaranteeing that the authenticated second radio node is indeed the intended second radio node while taking into account missing first ranging signals due to disturbances such as noise and interference.

In an example, the authentication setup information may comprise at least one of an initial channel parameter and a cryptographic key, and further may comprise computing the sequence of channel parameters based on the initial channel parameter and/or the cryptographic key. This type of authentication setup information allows the implementation of several methods to verify that the first ranging signal is originating from the known source.

The method may comprise transmitting a plurality of the second ranging signal to the second radio node and receiving a plurality of the first ranging signal from the second radio node, where determining the range is based on the plurality of the first ranging signals and authenticating the second radio node is based on the plurality of the first ranging signals. This allows for the constant mutual authentication of both the communicating radio nodes, by each other, while calculating the average range at the first radio node.

Determining the range may comprise analyzing the plurality of received first ranging signals. Moreover, authenticating the second radio node may comprise determining an indication of a certainty of the determined range. This type of authentication of the second radio node provides another way to check the authenticity of the second radio node based on statistical means performed on a plurality of first ranging signals.

In an example, the first ranging parameter and the second ranging parameter may comprise at least one of time of arrival and phase. This allows for the use of various ranging techniques to calculate the Time-of-Flight (ToF).

According to a second aspect of the invention, a method for performing authenticated ranging measurement by a second radio node is provided. The method comprises determining authentication information based on authentication setup information and transmitting a first ranging signal to a first radio node, the first ranging signal representing the authentication information. According to these features the second radio node can prove that the first ranging signal originates from the second radio node.

In an example, the method may further comprise communicating at least part of the authentication setup information between the first radio node and the second radio node using a secure communication protocol. This allows for an easy integration of the authenticated ranging measurement method to any protocol supported by the radio nodes by securely transferring at least a part of the authentication setup information at the beginning of the communication between the first radio node and the second radio node using any communication protocol available at the radio node.

In an example, the authentication setup information may include a shared secret or a private key. This type of authentication setup information allows the implementation of several methods to encode the ranging signal.

In an example, the authentication information may comprise a digital message, and the first ranging signal may comprise the digital message. This allows for checking the authenticity of the second radio node, at a first radio node, by using a digital message comprised in the first ranging signal. This allows strong authentication methods such as cryptographic key based methods to be used.

In an example, the method may further comprise receiving a challenge comprising a digital message, and computing a response to the challenge, the response comprising a digital message, based on the challenge and a cryptographic key, wherein the authentication information comprises the response to the challenge. This allows the use of a challenge-response protocol for the authentication of the second radio node by the first radio node to protect the ranging signal by embedding the digital message of the response to the challenge in the first ranging signal.

In an example, the first ranging signal may be conveyed in a direct wireless connection in accordance with a standard wireless communications protocol set up between the first radio node and the second radio node. This way there is no interference between the protocol and the ranging signal. The system bandwidth is thus used more efficiently. Also, the implementation of the radio node can be less complex since the ranging signal is transmitted using the standard wireless communications protocol, which may present the enablement of other kinds of communications of the radio node.

In an example, transmitting the first ranging signal may comprise determining at least one channel parameter of a communications channel based on the authentication setup information, and transmitting the first ranging signal in the channel of the channel parameter. Since the communications channel to be used for the first ranging signal depends on the authentication setup information, an unauthorized radio node that does not possess the authentication setup information is not able to know the communications channel through which to send the first ranging signal. Therefore, only the authenticated second radio node can transmit the valid ranging signal.

In an example, the channel parameter may comprise a radio frequency. This is a suitable channel parameter for the use of unmodulated carrier signals for the purpose of authenticated ranging.

The method may further comprise tuning to a plurality of communications channels according to a sequence of channel parameters and transmitting the first ranging signal in each of the plurality of communications channels. This allows for particularly secure authenticated first ranging signals, because it is more difficult to know a large number of frequencies for transmitting of first ranging signals by a communicating imposter radio node. This makes it impossible for the imposter radio node to fake the repetitive measurement process. For example the method comprises transmitting the first ranging signal subsequently in each of the plurality of communications channels according to the order of the sequence of channel parameters.

In an example, the authentication setup information may comprise at least one of an initial channel parameter and a cryptographic key, and may further comprise computing the sequence of channel parameters based on the initial channel parameter and/or the cryptographic key. This type of authentication setup information allows the implementation of several methods to verify that the first ranging signal is being transmitted from an authentic known source.

A third aspect of the invention provides a first radio node for performing authenticated ranging measurement. The first radio node may comprise a transceiver configured to receive a first ranging signal from a second radio node. Moreover, the first radio node may comprise a controller configured to determine a first ranging parameter based on the first ranging signal, determine a range based on the first ranging parameter, and authenticate the second radio node based on the first ranging signal and the authentication setup information comprising a condition on the first ranging signal.

In an example, the transceiver may be configured to transmit a second ranging signal to a second radio node. Moreover, the controller may be configured to receive information indicating a second ranging parameter based on the second ranging signal from the second radio node, and may be further configured to determine a range based on the first ranging parameter and the second ranging parameter.

In an example, the controller may be further configured to determine authentication information based on the authentication setup information, where the transmitted second ranging signal represents the authentication information.

In an example, the transceiver may be further configured to communicate at least part of the authentication setup information between the first radio node and the second radio node using a secure communication protocol.

In an example, the authentication setup information may comprise a shared secret or a public key.

The controller may be further configured to compute a value based on the received first ranging signal and the authentication setup information, and determine if the condition is satisfied based on the computed value; and authenticate the second radio node if the condition is satisfied.

The controller may be further configured to extract a digital message comprised in the received first ranging signal, where the condition on the first ranging signal comprises a condition on the digital message.

The controller may be further configured to transmit a challenge to the second radio node and receive the first ranging signal as a response to the challenge from the second radio node. Moreover, the controller may be further configured to determine if the condition is satisfied based on the response to the challenge and a cryptographic key and authenticate the second radio node if the condition is satisfied.

In an example, the first ranging signal and the second ranging signal may be conveyed in a direct wireless connection in accordance with a standard wireless communications protocol set up between the first radio node and the second radio node.

The controller may be further configured to determine at least one channel parameter of a communications channel based on the authentication setup information, control the transceiver to listen to the communications channel having the channel parameter and receive the first ranging signal in the channel having the channel parameter.

In an example, the channel parameter may comprise a radio frequency.

The controller may be further configured to control the transceiver to tune to a plurality of communications channels according to a sequence of channel parameters and receive the first ranging signal in each of the plurality of communications channels.

The controller may be further configured to authenticate the second radio node if the first ranging signal has been successfully received on a certain sufficient number of the plurality of communications channels.

In an example, the authentication setup information may comprise at least one of an initial channel parameter and a cryptographic key. Moreover, the controllers may be further configured to compute the sequence of channel parameters based on the initial channel parameter and the cryptographic key.

In an example the controller may be further configured to calculate the range by analyzing the plurality of received first ranging signals, and authenticate the second radio node by determining an indication of a certainty of the calculated range.

The controller may be further configured to control the transceiver to transmit a plurality of the second ranging signal to the second radio node and receive a plurality of the first ranging signal from the second radio node. Further, the controller may be further configured to determine the range based on the plurality of the first ranging signals, and authenticate the second radio node based on the plurality of the first ranging signals.

In an example first ranging parameter and the second ranging parameter may comprise at least one of time of arrival and phase.

A fourth aspect of the invention provides a second radio node for performing authenticated ranging measurement.

The second radio node may comprise a controller configured to determine authentication information based on the authentication setup information. Moreover, the second radio node may comprise a transceiver configured to transmit a first ranging signal to a first radio node, the first ranging signal representing the authentication information.

In an example the controller may be further configured to control the transceiver to communicate at least part of the authentication setup information between the first radio node and the second radio node using a secure communication protocol.

In an example the authentication setup information may include a shared secret or a private key.

In an example the authentication information may comprise a digital message. Moreover, the first ranging signal comprises the digital message.

The controller may be further configured to receive a challenge comprising a digital message, and compute an encrypted digital message based on the digital message and a cryptographic key, where the authentication information comprises the encrypted digital message.

The controller may be further configured to control the transceiver to convey the first ranging signal in a direct wireless connection in accordance with a standard wireless communications protocol set up between the first radio node and the second radio node.

The controller may be further configured to determine at least one channel parameter of a communications channel based on the authentication setup information, and control the transceiver to transmit the first ranging signal in the channel of the channel parameter.

In an example the channel parameter may comprise a radio frequency.

The controller may be further configured to control the transceiver to tune to a plurality of communications channels according to a sequence of channel parameters and transmit the first ranging signal in each of the plurality of communications channels.

In an example, the second radio node where the authentication setup information comprises at least one of an initial channel parameter and a cryptographic key, and where the controller is further configured to compute the sequence of channel parameters based on the initial channel parameter and the cryptographic key. This type of authentication setup information allows the implementation of several methods to verify that the first ranging signal is being transmitted from an authentic known source.

It will be appreciated by those skilled in the art that two or more of the above-mentioned embodiments, implementations, and/or aspects of the invention may be combined in any way deemed useful. Modifications and variations of the methods, which correspond to the described modifications and variations of the devices, can be carried out by a person skilled in the art on the basis of the present description.

BRIEF DESCRIPTION OF THE DRAWINGS

These and other aspects of the present invention will be discussed in more detail below, with reference to the attached drawings.

DETAILED DESCRIPTION OF EMBODIMENTS

Figure 1A:
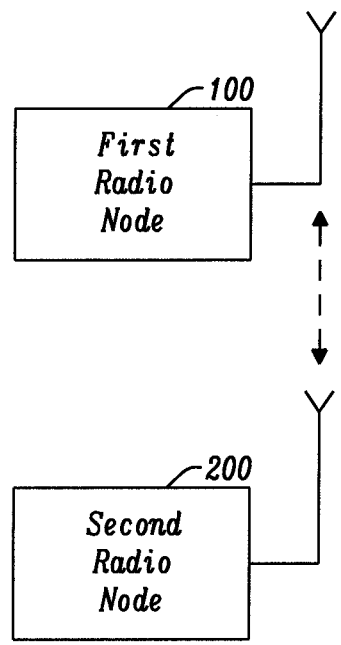
FIG. 1A shows a authenticated ranging measurement system.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

For the purpose of determining the extent of protection conferred by the claims of this document, due account shall be taken of any element, which is equivalent to an element specified in the claims.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the spirit and scope of the invention. In addition, descriptions of well-known functions and constructions may be omitted for clarity and conciseness.

The techniques disclosed herein can find utility as a method and device for performing authenticated ranging measurements between a first radio node and a second radio node. For example, in the so-called "relay" attack in automotive key-fobs, where next to the exchange of security keys also the distance between key-fob and car is required. Current ranging solutions make use of modulated or unmodulated carriers without embedding security (authentication). In order to increase the security level of ranging, the techniques disclosed herein may be used to integrate the process of authentication and ranging measurements in an inseparable manner.

Authenticated ranging measurement at a first radio node refers to the process of determining distance to a second radio node, using a ranging signal received from the second radio node, while performing authentication of the second radio node using the same ranging signal received and vice versa. This may allow the radio nodes to perform secure ranging measurements.

Various ranging measurement methods to calculate the Time-of-Flight (ToF) for radio network with multiple radio nodes can be performed using modulated carriers, either coherent or non-coherent, or using non-modulated carriers.

In the case of non-modulated carrier transmission, ranging measurements between a first radio node and a second radio node can be based on phase measurements of unmodulated carriers.

In the case of modulated carrier transmission, ranging measurement between the first radio node and the second radio node may be calculated based on time of arrival of the modulated carriers.

FIG. 1A shows as an example system architecture for performing authenticated ranging measurement. The authenticated ranging measurement system architecture comprises a first radio node 100 and a second radio node 200. The first radio node 100 and the second radio node 200 are shown to be communicating wirelessly with each other using an appropriate communication standard. The appropriate communication standard can be a server based wireless communication protocol, such as Wireless Fidelity (Wi-Fi), 2G, 3G, 4G, and upcoming 5G communication protocol etc., or a direct wireless communication protocol, or a combination of both. For example, the ranging signals themselves may be transmitted via direct wireless signals between the first radio node and the second radio node.

The authenticated ranging measurements between the first radio node 100 and the second radio node 200 may be performed based on modulated and non-modulated radio carrier frequencies. Several kinds of modulations, for example, phase modulation, time width modulation, amplitude modulation etc., can be used by the radio devices.

In one example during the complete (or part) sequence of range measurement the authentication process may be active, assuring authentic first radio node 100 and second radio node 200 of secure ranging measurement.

Figure 1B:
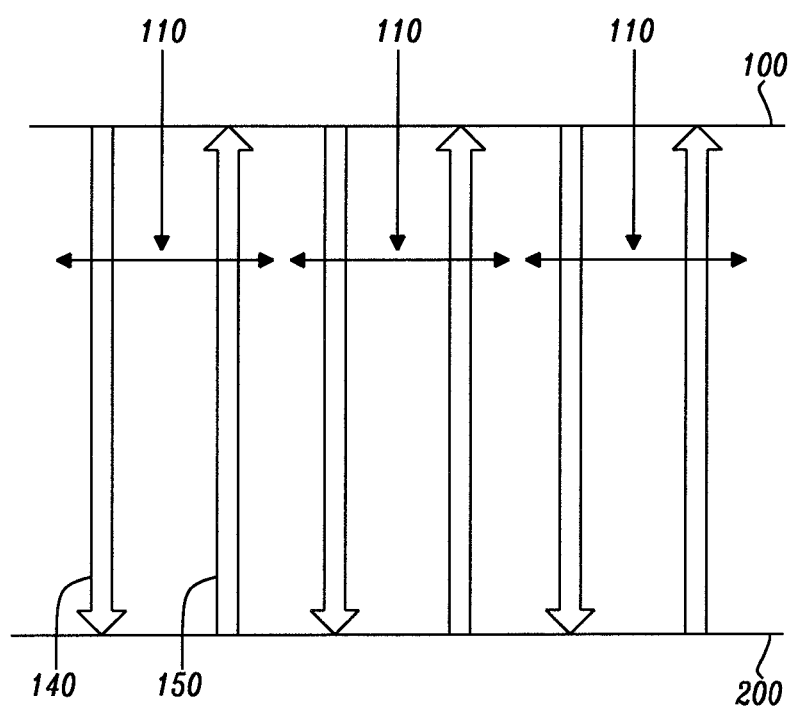
FIG. 1B shows a diagram with ranging signals.

FIG. 1B shows a diagram with ranging signals. The first radio node 100 receives a ranging signal 150, which is referred to hereinafter as the "first ranging signal", from a second radio node 200, which is used for the purpose of calculating a first ranging parameter while authenticating the second radio 200 node at the first radio node 100. The second radio node 200 receives a ranging signal 140, which is referred to hereinafter as the "second radio signal", from a first radio node 100, which is used for calculating a second ranging parameter while authenticating the first radio node 100 at the second radio node 200. The reception of a first ranging signal 150 by a first radio node 100 and a second ranging signal 140 by a second radio defines an atom 110. An atom 110 is used to calculate the first and the second ranging parameter while allowing the communicating radio nodes to possibly authenticate each other using their respectively received ranging signals. In the example shown in FIG. 1B, a sequence of atoms 110 can be generated. A plurality of the first ranging parameter and a plurality of the second ranging parameter may be calculated for such a sequence of atoms 110. Furthermore, a range between the first radio node 100 and the second radio node 200 may be calculated based on the plurality of the first ranging parameter and the plurality of the second ranging parameter.

Figure 2:
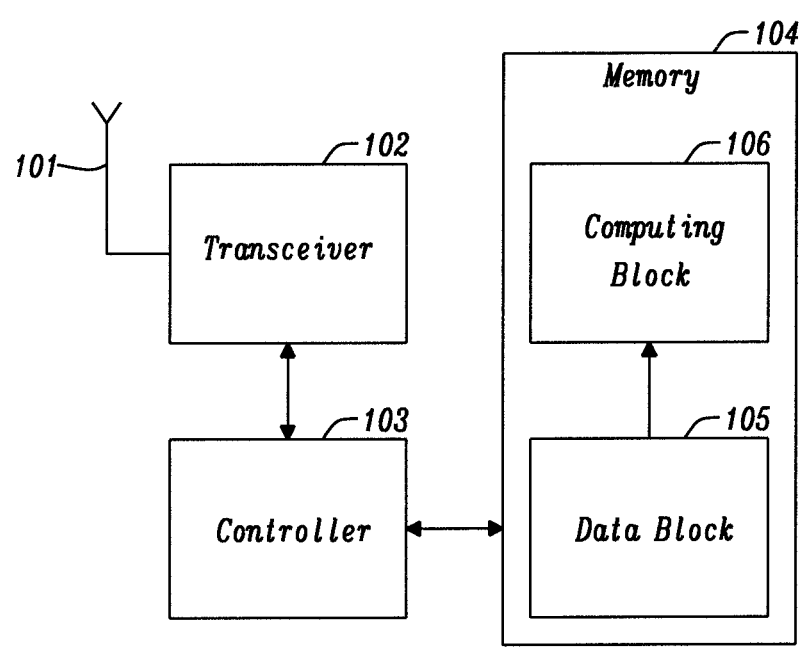
FIG. 2 shows a radio node for performing authenticated ranging measurement.

FIG. 2 shows a block diagram of an example of a radio node for performing authenticated ranging measurements. The radio node may comprise an antenna 101, a transceiver 102, a controller 103 and a memory 104. The antenna 101 is connected to the transceiver 102 and is used for transmitting and/or receiving a signal. The antenna 101 may be used for sending and/or receiving signals wirelessly, from and to a radio node, using an appropriate communication standard. The controller 103 controls operation of the radio node including the transceiver 102 and the memory 104. The data block 105 of the memory 104 may be used to store various data, including but not limited to authentication setup information. The authentication setup information may be determined based on the authentication protocol used. The computing block 106 may comprise executable computer code that implements a method for performing authenticated ranging measurements by the radio node. The block diagram of the radio node, shown in FIG. 2, may be used to operate as the first radio node 100 or as the second radio node 200, or both.

In one example, the radio node may function as the first radio node 100 used for performing authenticated ranging measurement, where the transceiver 102 may be configured to receive a first ranging signal 150, from a second radio node 200, using antenna 101. Under the control of the controller 104, the computing block 106 may be configured to determine a first ranging parameter based on the first ranging signal 150. Under the control of the controller 103, the computing block 106 may then determine a range based on the first ranging parameter. Moreover, the computing block 106 may authenticate the second radio node 200 based on the first ranging signal and authentication setup information comprising a condition on the first ranging signal 150.

The authentication setup information may comprise a shared secret or a public key, which allows the implementation of several types of authentication methods. For example, the authentication set up information for a non-modulated carrier based authentication protocol may comprise a shared secret known a priori to both the first radio node and the second radio node 200, or the authentication setup information may comprise private and public cryptographic keys of the first radio node, where only the public cryptographic key of the first radio node 100 is exchanged with the second radio node 200 and vice versa, for a mutual authentication algorithm. Furthermore, at least a part of the authentication setup information may be communicated using any secure communication protocol supported on the first radio node 100 and the second radio node 200, for example a peer-to-peer data communication protocol such as Bluetooth or Zigbee, or for example WiFi, or a cellular data communication protocol such as 2G, 3G, 4G or 5G. The authentication setup information may be communicated at the beginning of the ranging communication between the first radio node 100 and the second radio 200. This may allow for easy integration of the authenticated ranging measurement method to any radio nodes which support a secure communication protocol.

The transceiver 102 may further be configured to transmit a second ranging signal 140 to a second radio node 200 using antenna 101. Moreover, the controller 103 can be further configured to receive information indicating a second ranging parameter from the second radio node 200, where the second radio node 200 uses the second ranging signal 140 to determine this second ranging parameter. Under the control of the controller 103 the computing block 106 may then determine a range based on the first ranging parameter and the second ranging parameter.

For example, for an unmodulated carrier with frequency $f_A$, received by the first radio node 100 (i.e., the first ranging signal 150 transmitted by the second radio node 200) and travelling over a distance r, the measured phase (i.e., the first ranging parameter) for the second radio node 200, as calculated at the first radio node 100, can be given as below:

$$\varphi_A = r/cf_A + \varphi_c$$

wherein $\varphi$ represents an arbitrary constant and c represents the speed of light in a medium.

However, the first radio node 100 and the second radio node 200 have their own individual clock sources not running at exactly the same frequency. Thus, $\varphi_c$ becomes time dependent resulting in a different slope, hence distance. To mitigate the mismatch of both timing sources at both the first radio node 100 and second radio node 200, alternating transmissions from both radio nodes are applied. Both sides receive phases with opposite $\varphi_c(t)$ dependence at times separated by a ping-pong period (Tpp), as shown below:

$$\varphi_A = r/cf_A + \varphi_c(t)$$

$$\varphi_B = r/cf_B - \varphi_c(t + T_{pp})$$

wherein $\varphi_A$ represents the phase measurement of unmodulated carrier $f_A$ (i.e., the first ranging parameter), from the second radio node 200, obtained at the first radio node 100. Also, $\varphi_c(t) = t\, f_{ec}$, wherein $f_{ec}$ is the carrier error frequency due to difference in clock sources. Similarly, $\varphi_B$ represents the phase measurement of unmodulated carrier $f_B$ (i.e., the second ranging parameter), from the first radio node 100, obtained at the second radio node 200. Both radio nodes can then exchange their respective phase measurement results with each other.

By adding both phase measurements, at the first radio node 100 or the second radio node 200, a linear relation with $f_A + f_B$ can be obtained, as shown below:

$$\varphi_A + \varphi_B = (f_A + f_B) r/c - T_{pp} f_{ec}$$

Thus the first radio node 100 or the second radio node 200 can calculate the range between them using the slope.

Similarly, for example, upon reception of a modulated carrier packet from a transmitting radio node the receiving radio node calculates the time of arrival of the packet relative to its own clock system. However, as also mentioned above, each radio nodes A and B have their own individual clock sources, which are not running at exactly the same phase. By adding (or, for example, averaging, or otherwise combining) both measurements, the unknown phase offset between their local clock systems may be mitigated.

The controller 103 may further determine authentication information based on the authentication setup information. The transceiver 102, under the control of the controller 103, may then transmit the second ranging signal 140, which represents the authentication information. This allows the first radio node 100 to embed authentication also in the second ranging signal 140, which can result in secure bidirectional communication between the radio nodes. For example, the authentication information can be an encrypted digital message comprised in the second ranging signal 140, which may be used by the second radio node 200 to authenticate the first radio node 100.

Under the control of the controller 103 the computing block 106 may compute a value based on the received first ranging signal 150 and the authentication set up information. The computed value may then be used to determine if the condition is satisfied. The controller 103 can authenticate the second radio node 200 if the condition is satisfied.

In another example, the radio node may function as the second radio node 200 used for performing authenticated ranging measurement, where under the control of the controller 103 the computing block 106 may be configured to determine authentication information based on authentication setup information. The authentication setup information may comprise a shared secret or a private key, which allows the implementation of several type of authentication methods. For example, the authentication set up information for a non-modulated carrier based authentication protocol may comprise a shared secret and an initial carrier frequency ($f_0$), or the authentication setup information may comprise private and public cryptographic keys of the first radio node, where only the public cryptographic key of the first radio node 100 is exchanged with the second radio node 200 and vice versa, for a mutual authentication algorithm. Furthermore, at least part of the authentication setup information may be communicated using any secure communication protocol supported on the first radio node 100 and the second radio node 200, for example Bluetooth, WiFi, 2G, 3G, 4G or 5G. The authenticated setup information may be communicated at the beginning of the communication between the first radio node 100 and the second radio 200. This may allow for easy integration of the authenticated ranging measurement method to any radio node that supports a secure communication protocol.

Moreover, a transceiver 102 may be configured to transmit, using the antenna, a first ranging signal 150 to a first radio node 100, where the first ranging signal 150 may represent the authentication information. This allows the second radio node 100 to embed authentication in the first ranging signal 150, which can result in secure communication between the radio nodes. For example, the authentication information can be an encrypted digital message comprised in the first ranging signal 150, which may be used by the first radio node 100 to authenticate the second radio node 200.

Figure 3:
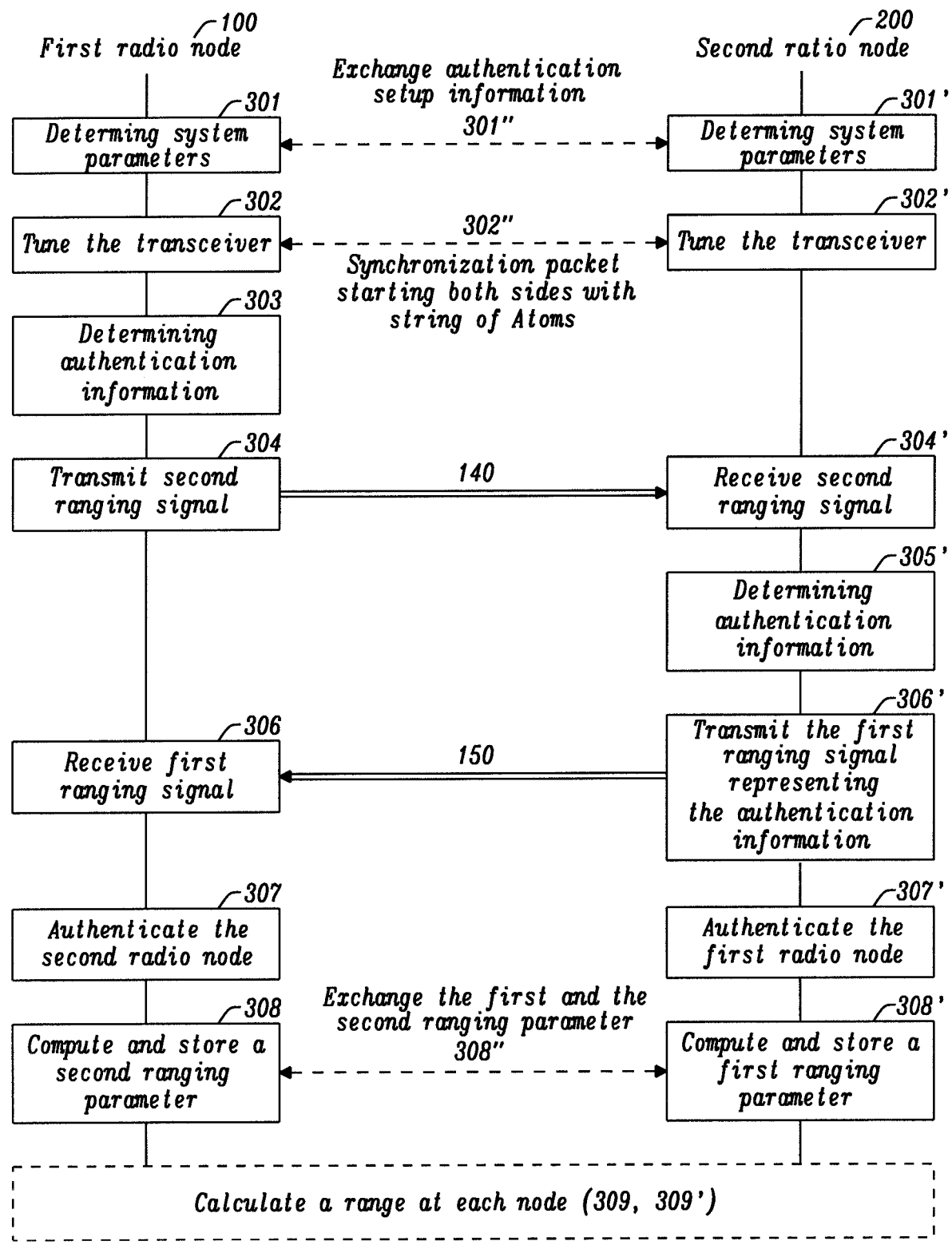
FIG. 3 shows a flowchart of a system comprising a first radio node and a second radio node for performing authenticated ranging measurement.

FIG. 3 illustrates an example of how the first radio node 100 and the second radio node 200 can cooperate to perform authenticated ranging measurement.

In step 301 and step 301' the first radio node 100 and the second radio node 200 determine their system parameters. The system parameters may include the authentication setup information and a length of atomic string (N). For example, the authentication set up information for a non-modulated carrier based authentication protocol may comprise a shared secret and an initial carrier frequency ($f_0$), or a complete sequence of carrier frequencies. Alternatively, for example for a modulated carrier-based authentication protocol, the authentication setup information may comprise private and public cryptographic keys of the radio nodes.

At least a part of the authentication setup information may need to be negotiated between the radio nodes. For example, messages 301" can be exchanged about the shared key and the initial carrier frequency ($f_0$) that can be used by both the radio nodes. Also for example, messages can also be exchanged about the public keys of a radio node that can be used by another communicating radio node. Optionally, the system parameters including the authentication setup information can be obtained from the data block 105 of the memory 104.

After the determination of the system parameters, the first radio node 100 and the second radio node 200, in step 302 and 302', may tune their transceivers to align the reception and transmission processes, to start both sides with a string of atoms. This may be performed by exchanging a synchronization packet 302" between the first radio node 100 and the second radio node 200.

The first radio node 100 may further determine first authentication information based on its available authentication setup information, in step 303. The first radio node 100 may then transmit the second ranging signal 140, in step 304, which represents the authentication information, and which is received by the second radio node 200 in step 304'. For example, the first authentication information can be an encrypted digital message comprised in the second ranging signal 140, which may be used by the second radio node 200, after receiving the second ranging signal 140 in step 304', to authenticate the first radio node 100.

Similarly, the second radio node 200 may further determine second authentication information based on its available authentication setup information, in step 305'. The second radio node 200 may then transmit the first ranging signal 150, in step 306', which represents the authentication information. This allows the second radio node 100 to embed authentication in the transmitted first ranging signal 150, which can result in secure communication between the radio nodes. For example, the second authentication information can be an encrypted digital message comprised in the first ranging signal 150, which may be used by the first radio node 100, after receiving the first ranging signal 150 in step 306, to authenticate the second radio node 200.

Furthermore, each of the radio nodes may authenticate the other communicating radio node based on the corresponding received ranging signals and its authentication setup information, in steps 307 and 307'. For example, the first radio node 100 can authenticate the second radio node 200 based on the first ranging signal 150 and its authentication setup information. For example, the first radio node 100 may compute a value based on the received first ranging signal 150 and the authentication set up information. The computed value may then be used to determine if the condition is satisfied. The first radio node can then authenticate the second radio node 200 if the condition is satisfied, and similarly the second radio node 200 may authenticate the first radio node 100 based on the received second ranging signal 150.

In step 308, the first radio node 100 may calculate a first ranging parameter based on the received first ranging signal 150 and in step 308' the second radio node 200 may calculate a second ranging parameter based on and the received second ranging signal 140. For example, first ranging parameter and the second ranging parameter can be one of phase, for non-modulated carrier based authenticated ranging measurement method, or time of arrival, for modulated carrier based authenticated ranging measurement method.

The first radio node 100 and the second radio node 200 may then exchange their calculated first ranging parameter and the second ranging parameter with each other, by exchanging signals 308".

Finally, the first radio node 100 and the second radio node 200 may then calculate the range based on the first ranging parameter and the second ranging parameter, in steps 309 and 309'.

Below, two embodiments of the authenticated ranging measurement are described in greater detail.

First Embodiment (Non-Modulated Carrier Based Authenticated ToF)

Figure 4:
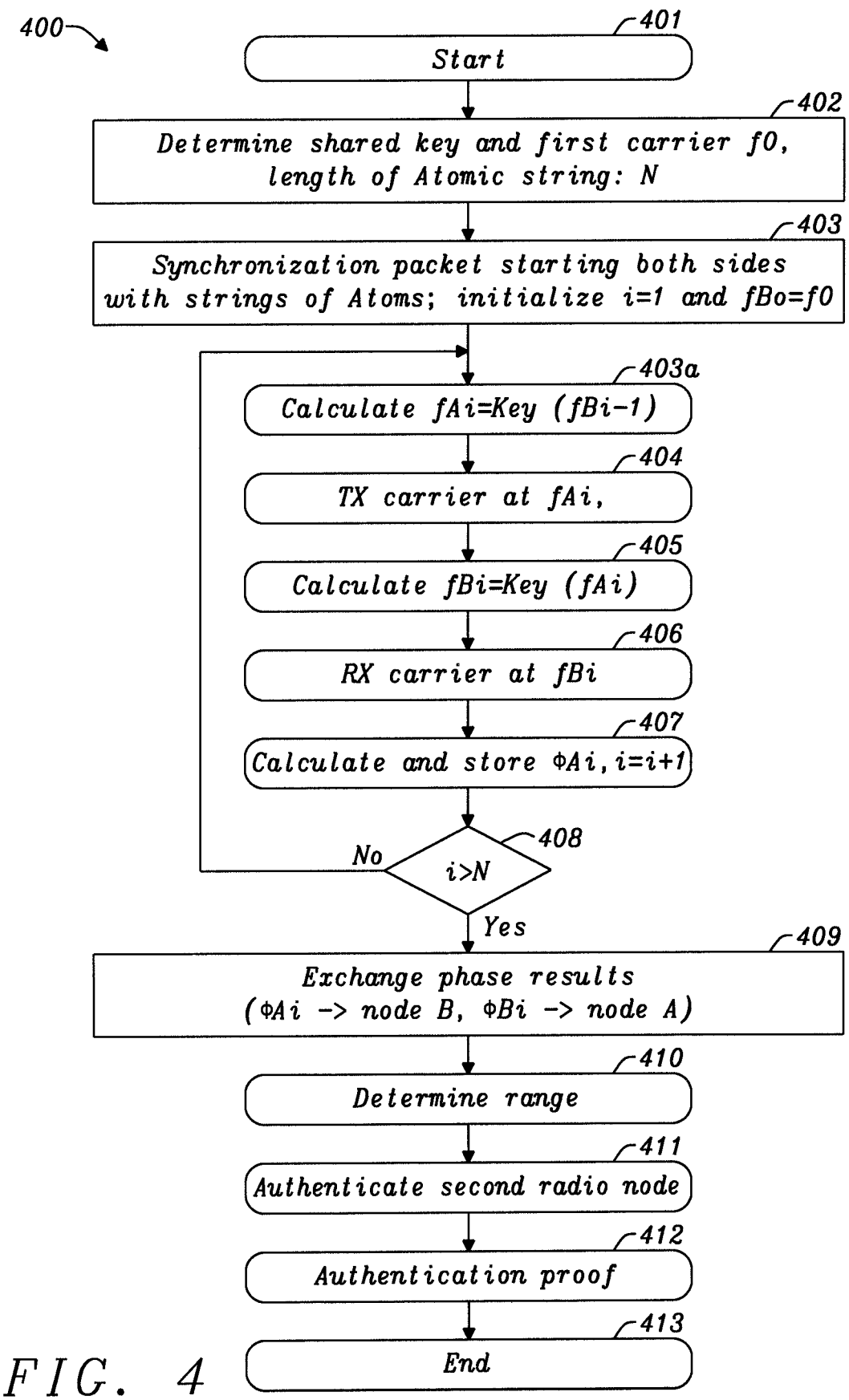
FIG. 4 shows a flowchart of a method for performing authenticated ranging measurement by a first radio node, for a non-modulated carrier based authenticated ToF measurement.
Figure 5:
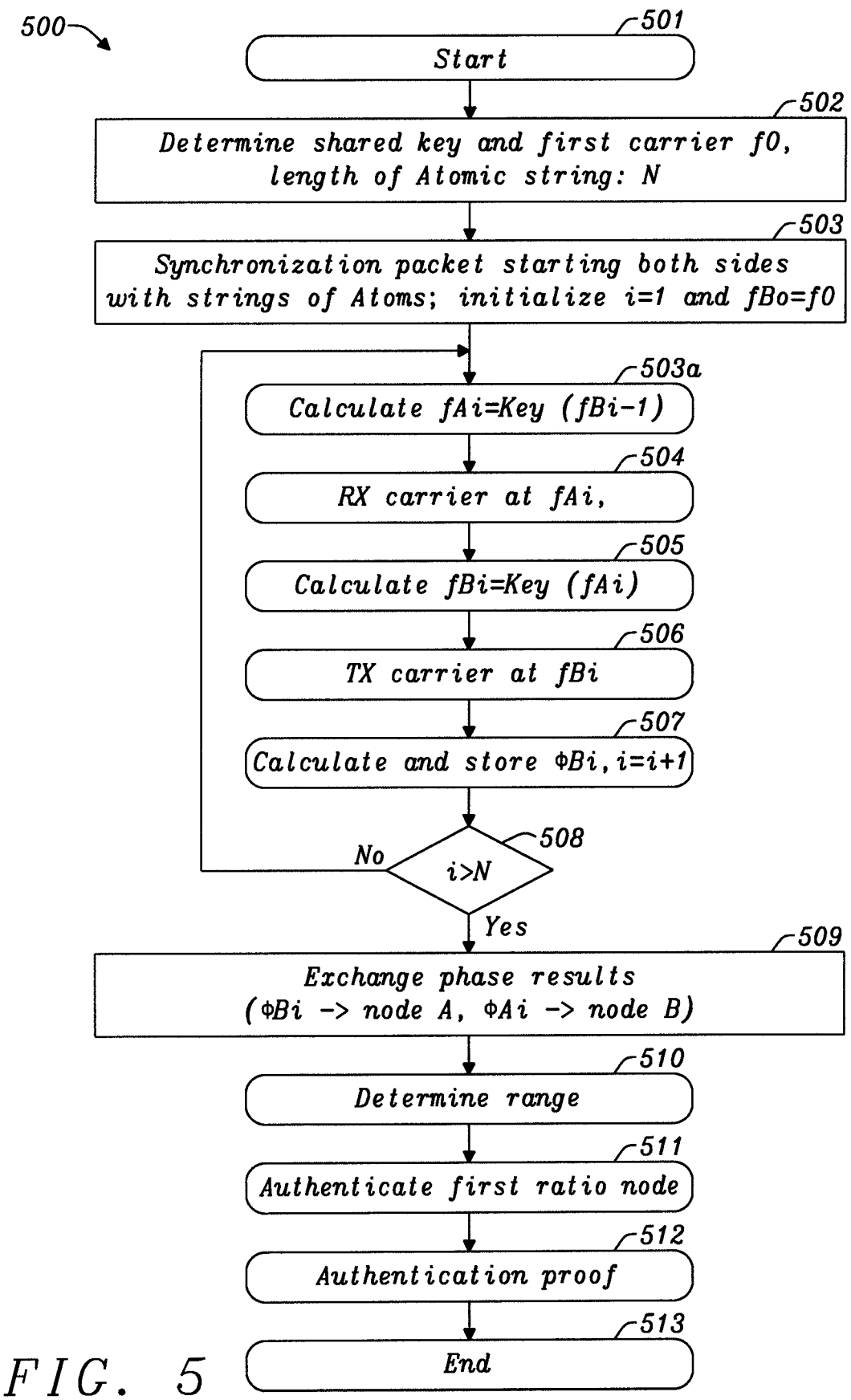
FIG. 5 shows a flowchart of a method for performing authenticated ranging measurement by a second radio node, for a non-modulated carrier based authenticated ToF measurement.

A first embodiment is shown in FIG. 4 and FIG. 5, which show flowcharts representing methods of a first radio node 100 and a second radio node 200, respectively.

FIG. 4 shows a method for performing authenticated ranging measurement by a first radio node 100, for a non-modulated carrier based authenticated ToF measurement.

The first radio node 100 starts the method at step 401. The start may be triggered by an appropriate internal or external signal, or an input provided by a user, for example. For example, the method starts when a second radio node 200 tries to set up a communication with the first radio node 100.

Figure 8:
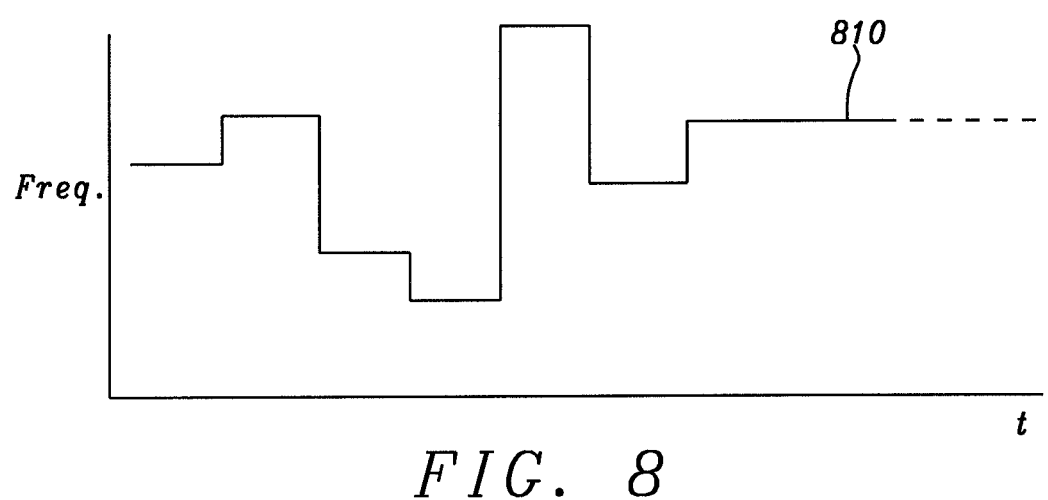
FIG. 8 shows a plot of an example of a sequence of selected radio frequency carriers as a function of time, for a non-modulated carrier based authenticated ToF measurement.

In step 402, the system parameters are determined. The system parameters may include the authentication setup information and a length of atomic string (N). The authentication set up information for a non-modulated carrier based authentication may comprise a shared key 610 and an initial carrier frequency ($f_0$), shown in FIG. 6. The shared key 610 and the initial carrier frequency can be used to generate a sequence of carriers at both the first radio node 100 and the second radio node 200 which are used for the ToF ranging measurements. The sequence of carriers may also be generated in another way, as long as the sequence is only known to the first and second radio node. Thus without a prior knowledge of the exact frequency trajectory, it is impossible for an imposter radio node to fake a measurement process. The selected carriers can be on a fine frequency grid 810, as shown in FIG. 8, even finer than the frequency deviation of the conventional data modulation. The string of atoms 110 can be chosen to be of any arbitrary length depending on the desired accuracy of the ranging measurement and the multipath conditions between the radio nodes.

For example, step 402 can involve negotiating between the first radio node 100 and the second radio node 200 about at least part or all of the system parameters to be used; for example, messages can be exchanged about the shared key 610 and the initial carrier frequency ($f_0$) that can be used by both the radio nodes. Optionally the system parameters can be obtained from the data block 105 of the memory 104.

In step 403 a synchronization packet can be exchanged between the first radio node 100 and the second radio node 200 to tune the transceivers to align the reception and transmission processes, to start both sides with a string of atoms. The synchronization packet may include, for example, a start time of the ranging signal transmission. Also an index of the atom in the atomic string may be initialized to a proper value, e.g. 1, and a channel parameter, e.g. a frequency, for index i=0, set to the initial carrier frequency $f_0$.

In step 403a a channel parameter, is calculated for the ranging signal of atom i to be transmitted. In the illustrated example, the controller may calculate the transmission frequency $fA_i$ by applying the shared key to the previous reception frequency $fB_0$.

Figure 6:
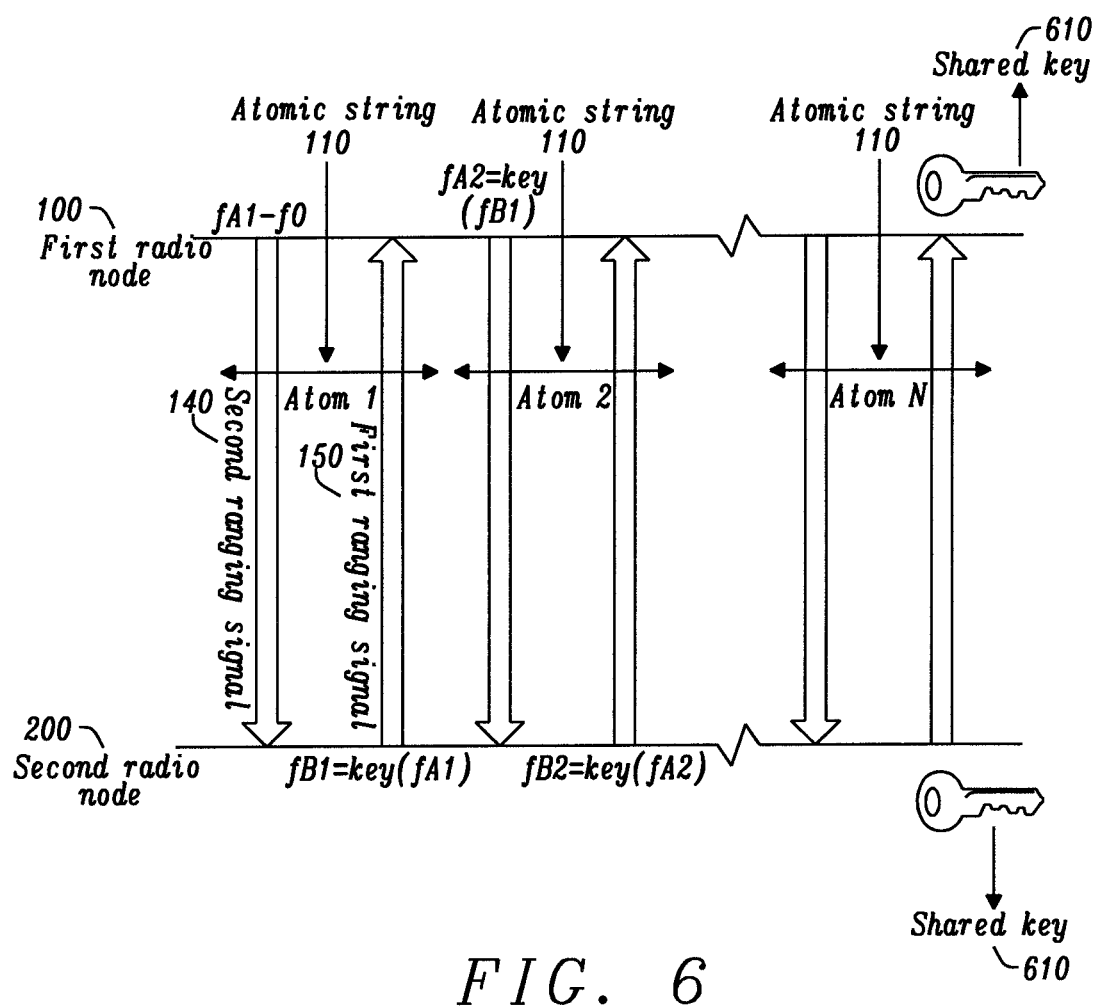
FIG. 6 shows a timing diagram of an exchange of atoms between the first radio node and the second radio node for a non-modulated carrier based authenticated ToF.

After the initial synchronization between the first radio 100 and the second radio node 200, the first radio node 100 transmits (TX) to the second radio node 200 a second ranging signal 140, as shown in FIG. 6, in Step 404. The second ranging signal 140 can be transmitted at the calculated carrier frequency $fA_i$.

In Step 405, under the control of the controller 103, the computing block 106 determines a channel parameter of a communications channel based on the authentication setup information and the previous communications channel, used for the transmission. For example, under the control of the controller 103, the computing block 106 determines a radio carrier frequency $fB_i$ of the communication channel based on the shared key 610 and the previous transmission frequency $fA_i$.

The controller 103 may tune the transceiver 102 and the antenna 101 to listen to the communications channel having the channel parameter, for example the determined radio carrier frequency $fB_i$. Thereafter, in Step 406, the first radio node 100 may receive (RX), using the antenna 101 and the transceiver 102, a first ranging signal 150 from the second radio node 200, as shown in FIG. 6.

In step 407, under the control of the controller 103, the computing block 106 calculates a first ranging parameter, i.e., a phase $\varphi_{Ai}$, and stores the first ranging parameter in the data block 105 of the memory 104, and furthermore updates the index value i of the atomic string to be the next subsequent value.

The controller 103 may further check if the index value i of the atomic string 110 is greater than the chosen system parameter value of N in step 408. If the index i less than or equal to N, the process repeats step 403a through step 407 until the index i is greater than N. This corresponds to a length of atomic string equal to N.

If the index i is greater than N in step 408, the method continues to the next step 409 wherein the first radio node 100 may transmit the calculated set of first ranging parameters $\varphi_{Ai}$ for all the atoms i, where $i \in \{1, \ldots, N\}$, to the second radio node 200, and receive a set of second ranging parameters, i.e., a set of phase values $\varphi_{Bi}$, calculated at the second radio node 200 for all indexes i of the atom string 110, where $i \in \{1, \ldots, N\}$. Under the control of the controller 103, the computing block 106 of the first radio node 100 may then determine a range, in step 410, based on the set of first ranging parameters and the set of second ranging parameters. For example, the first ranging parameter and the second ranging parameter (i.e., $\varphi_{Ai}$, $\varphi_{Bi}$) can be added for every atom index i, where $i \in \{1, \ldots, N\}$, and plotted as a function of the radio carrier frequencies used in every atom. The slope of the plot may provide the range between the first radio 100 node and the second radio node 200.

Figure 7:
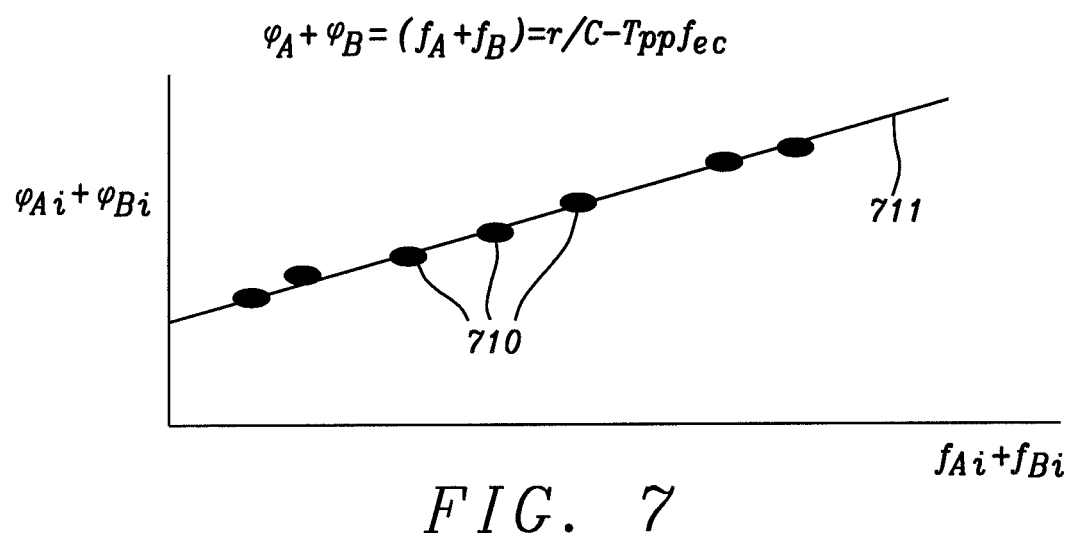
FIG. 7 shows a plot of an example of a summation of a first ranging parameter and a second ranging parameter as a function of the radio carrier frequencies used in every atom, for a non-modulated carrier based authenticated ToF measurement.

FIG. 7 shows an example of such a plot, including the data points 710 for each atom and the regression line 711 that determines the slope of the plot.

In Step 411, the controller 103 using the computing block 106 may further authenticate the second radio node 200. The authentication of the second radio node 200 may be performed based on the successful reception of the first ranging signals 150 on a certain sufficient number of the plurality of communication channels. For example, as discussed before, the controller 103 tunes the antenna 101 and the transceiver 102, in every index of the atomic string 110, to a radio carrier frequency, which may be determined based on the shared key 610 and the initial carrier frequency, to receive the first ranging signal 150 from the second radio node 200. The first ranging signal 140 is said to be successfully received at the tuned radio carrier frequency, if for example, the received signal power measured by the transceiver 102 is above a certain threshold power value.

However, it may be possible that the received signal power is above the threshold power value but the radio node contributing to the received signal power is another non-intended transmitting radio node, transmitting in the determined radio carrier frequency, and not from the intended second radio node 200. However, if a certain sufficient number of first ranging signals 150 are judged to be successfully received on a plurality of radio carrier frequencies, that are determined based on the authentication set up information, the first radio node 100 can authenticate the second radio node 200, as without a prior knowledge of the exact frequency trajectory 810 to send the first ranging signals 150 it is impossible for an imposter radio node to fake a measurement process.

In addition to, or as an alternative to step 411, a proof of authentication of the second radio node 200 can be calculated at Step 412, by determining an indication of certainty of the calculated range in Step 410. The indication of certainty of the calculated range can be determined based on any statistical means. For example, a Quality norm of the least means square (LMS) fit can be used on plot 710 of FIG. 7. Then the method is ended in Step 413.

As an example, the Steps 401, 402, 403, 409, 410, 411 and 412 can be performed by the first radio node 100 using a secure wireless communication protocol. This allows for an easy integration of the authenticated ranging measurement method to any wireless protocol standard available at the first radio node 100. Furthermore, as an example, the Steps 403a, 404, 405, 406, 407 and 408 can be performed by the first radio node 100 using a non-protocol based direct wireless connection.

FIG. 5 illustrates a method for performing authenticated ranging measurement by a second radio node 200, for a non-modulated carrier based authenticated ToF measurement.

The second radio node 200 starts the method at step 501. The start may be triggered by an appropriate internal or external signal, or an input provided by a user, for example.

For example, the method starts when a first radio node 100 tries to set up a communication with the second radio node 200.

In step 502, the system parameters are determined. The system parameters may include the authentication setup information and a length of atomic string 110 (N). The authentication set up information for a non-modulated carrier based authentication may comprise a shared key 610 and an initial carrier frequency ($f_o$), as shown in FIG. 6. The shared key 610 and the initial carrier frequency can be used to generate a sequence of carriers at both the first radio node 100 and the second radio node 200 which are used for the ToF ranging measurements. The sequence of carriers may also be generated in another way, as long as the sequence is only known to the first radio node 100 and the second radio node 200. Thus without a prior knowledge of the exact frequency trajectory, it is impossible for an imposter radio node to fake a measurement process. FIG. 8 shows an arbitrary example of frequencies used successively over time (t) as the frequencies $fA_i$ and $fB_i$. The selected carriers can be on a fine frequency grid 810, as shown in FIG. 8, even finer than the frequency deviation of the normal data modulation. The string of atoms 110 can be chosen to be of any arbitrary length depending on the desired accuracy of the ranging measurement and the multipath conditions between the radio nodes.

For example, step 502 can involve negotiating between the second radio node 200 and the first radio node 100 about at least part or all of the system parameters to be used, for example, messages can be exchanged about the shared key 610 and the initial carrier frequency ($f_O$) that can be used by both the radio nodes. Optionally the system parameters can be obtained from the data block 105 of the memory 104.

In step 503 a synchronization packet can be exchanged between the first radio node 100 and the second radio node 200 to tune the transceivers to align the reception and transmission processes, to start both sides with a string of atoms 110. An index to denote the current atom may be initialized to a suitable value, such as 1. A channel parameter, e.g. a frequency $fB_0$, for index i=0, is set to the initial carrier frequency $f_0$.

In step 503a a channel parameter, is calculated for the ranging signal of atom i to be received. In the illustrated example, the controller may calculate the reception frequency $f_A$ by applying the shared key to the previous transmission frequency $fB_{i-1}$.

After the initial synchronization between the first radio node 100 and the second radio node 200, the second radio node 200 receives (RX) from the first radio node 100 a first ranging signal 150, as shown in FIG. 6, in step 504. The first ranging signal 150 can be received at the calculated carrier frequency $fA_i$.

In Step 505, under the control of the controller 103, the computing block 106 determines a channel parameter of a communications channel based on the authentication setup information and the previous reception communications channel parameter. For example, under the control of the controller 103, the computing block 106 determines a radio carrier frequency $fB_i$ of the communication channel based on the shared key 610 and the previous reception frequency $fA_i$.

Thereafter, in step 506, the second radio node 200 may transmit (TX), using the antenna 101 and the transceiver 102, a first ranging signal 150 to the first radio node 100 in a communications channel having the channel parameter, for example the determined radio carrier frequency $fB_i$.

In step 507 under the control of the controller 103, the computing block 106 calculates a second ranging parameter, i.e., a phase $\varphi_{Bi}$, and stores the second ranging parameter in the data block 105 of the memory 104, and furthermore updates the index value i of the current atom to be the next subsequent value.

The controller 103 may further check if the index value i of the current atom is greater than the chosen system parameter value of N in step 508. If the index of the current atom is less than N, the process repeats step 504 through step 507 until the index of the current atom 110 is greater than N, so that an atomic string of N atoms may be realized If the length of the atomic string 110 is greater than N, the method continues to the next step 509 where the first radio node 100 may transmit the calculated set of second ranging parameters $\varphi_{Bi}$ for all the atoms i, where i∈{1, ..., N}, to the first radio node 100, and receive a set of first ranging parameters, i.e., a set of phase values $\varphi_{Ai}$, calculated at the first radio node 100 for all atoms i of the atom string 110, where i∈{1, ..., N}.

Under the control of the controller 103 the computing block 106 of the second radio node 200 may determine a range, in step 510, based on the set of first ranging parameters and the set of second ranging parameters. For example, the first ranging parameter and the second ranging parameter (i.e., $\varphi_{Ai}$, $\varphi_{Bi}$) can be added for every atom i, where i∈{1, ..., N} and plotted as a function of the radio carrier frequencies used in every atomic string, as shown in FIG. 7. The slope of the plot 710 may provide the range between the first radio 100 node and the second radio node 200.

In step 511, the controller 103, using the computing block 106 may further authenticate the first radio 100. The authentication of the first radio node 100 may be performed based on the successful reception of the second ranging signals 140 on a certain sufficient number of the plurality of communication channels. For example, as discussed before, the controller 103 tunes the antenna 101 and the transceiver 102, in every atom of the atomic string 110, to a radio carrier frequency, which may be determined based on the shared key 610 and the initial carrier frequency, to receive the second ranging signal 140 from the first radio node 100. The second ranging signal 150 is said to be successfully received at the tuned radio carrier frequency, if for example the received signal power measured by the transceiver 102 is above a certain threshold power value.

However, it may be possible that the received signal power is above the threshold power value but the radio node contributing to the received signal power is another non-intended transmitting radio node, transmitting in the determined radio carrier frequency, and not from the intended first radio node 100. Nevertheless, if a certain sufficient number of second ranging signals 140 are judged to be successfully received on a plurality of radio carrier frequencies that are determined based on the authentication set up information, the second radio node 200 can authenticate the first radio node 100, as without a prior knowledge of the exact frequency trajectory 810 to send the second ranging signals 140 it is impossible for an imposter radio node to fake a measurement process.

In addition to, or alternatively to step 511, a proof of authentication of the first radio node 200 can be calculated at step 512, by determining an indication of certainty of the calculated range in Step 510. The indication of certainty of the calculated range can be determined based on any statistical means. For example, a Quality norm of the least means square (LMS) fit can be used on plot 710 of FIG. 7. Then the method is ended in Step 513.

As an example, the steps 501, 502, 503, 509, 510, 511 and 512 can be performed by the second radio node 200 using a secure wireless communication protocol. This allows for an easy integration of the authenticated ranging measurement method to any wireless protocol standard available at the second radio node 200. Furthermore, as an example, the steps 503a, 504, 505, 506, 507 and 508 can be performed by the second radio node 200 using a non-protocol based direct wireless connection.

Although the abovementioned description has been written by disclosing an example where both the first radio node 100 and the second radio 200 may perform authentication of each other, it is also possible that the steps of authentication of a radio node may only be performed by either the first radio node 100 or the second radio node 200 and not by both the radio nodes. For example, in the case of performing authenticated ranging measurement between a key-fob and a car, it may be necessary to authenticate the key-fob by the car and not vice versa. In such a case, for example, only the channel parameters of the ranging signals transmitted by the second radio node could use the 'secret' sequence of channel parameters, for example using the formula $fB_i=Key(fB_{i-1})$ in steps 405 and 505. In steps 403a and 503a, a predetermined non-secret sequence of channel parameters could be used for the values of $fA_i$.

Second Embodiment (Modulated Carrier Based Authenticated ToF)

A modulated carrier based authenticated ranging measurement method may use various modulation types, for example, phase/frequency modulation, time width modulation, amplitude modulation, etc. The data content of the modulated packets may be used by a mutual authentication algorithm. The authentication process may be active during the complete (or part) of the sequence of range measurement.

As an example, the second embodiment will be described by using a public key cryptographic method that is used as the authentication algorithm for the modulated carrier based authenticated ToF/ranging measurement method. For example, in the public key cryptographic method, the first radio node 100 can send a randomly generated digital message, e.g., a random seed SA, to a second radio node 200. The second radio node 200 may then encrypt the received digital message with second radio node's private key, e.g., PrivB(SA), and send it back to first radio node 100. The message is then verified by first radio node using the public key of second radio node, e.g., PubB (PrivB(SA)). However, it may be noted that the embodiment can make use of any other suitable authentication solution.

Figure 9:
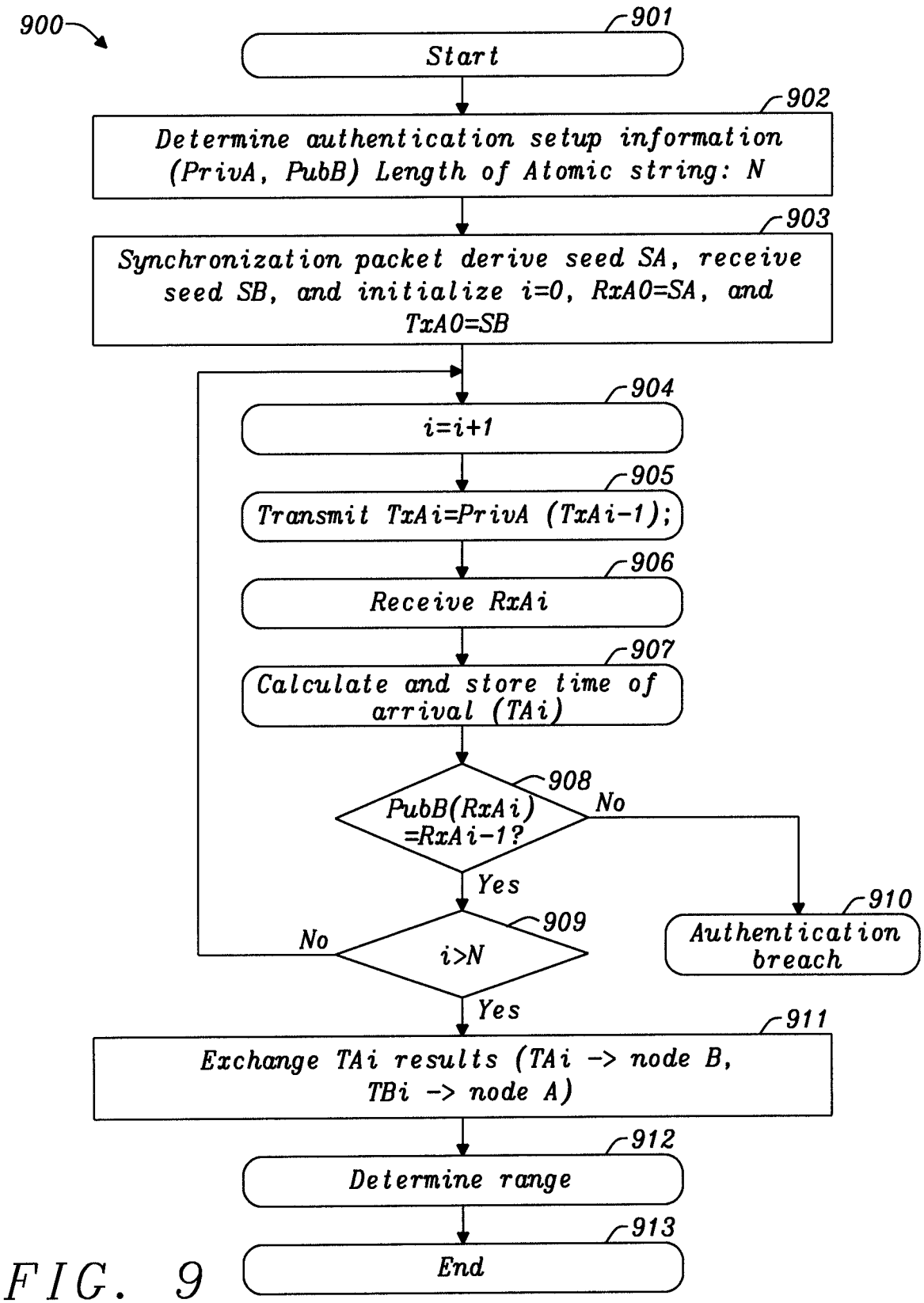
FIG. 9 shows a flowchart of a method for performing authenticated ranging measurement by a first radio node, for a modulated carrier based authenticated ToF measurement.
Figure 10:
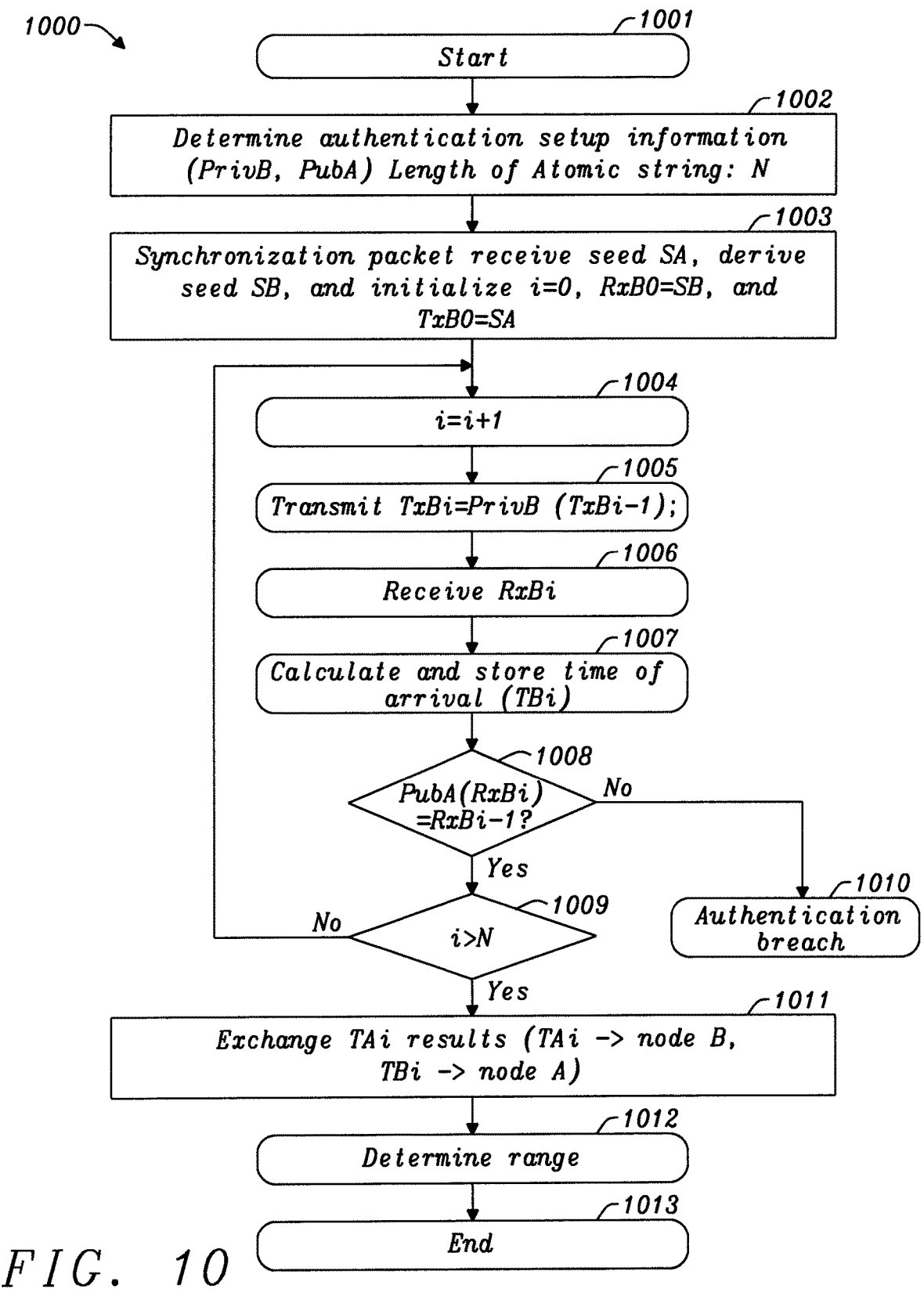
FIG. 10 shows a flowchart of a method for performing authenticated ranging measurement by a second radio node, for a modulated carrier based authenticated ToF measurement.

The second embodiment is illustrated in FIG. 9 and FIG. 10, which show flowcharts representing methods of a first radio node 100 and a second radio node 200, respectively.

FIG. 9 shows a method for performing authenticated ranging measurement by a first radio node 100, for modulated carrier based authenticated ToF measurement.

The first radio node 100 starts the method at step 901. The start may be triggered by an appropriate internal or external signal, or an input provided by a user, for example. For example, the method starts when a second radio node 200 tries to set up a communication with the first radio node 100.

Figure 11:
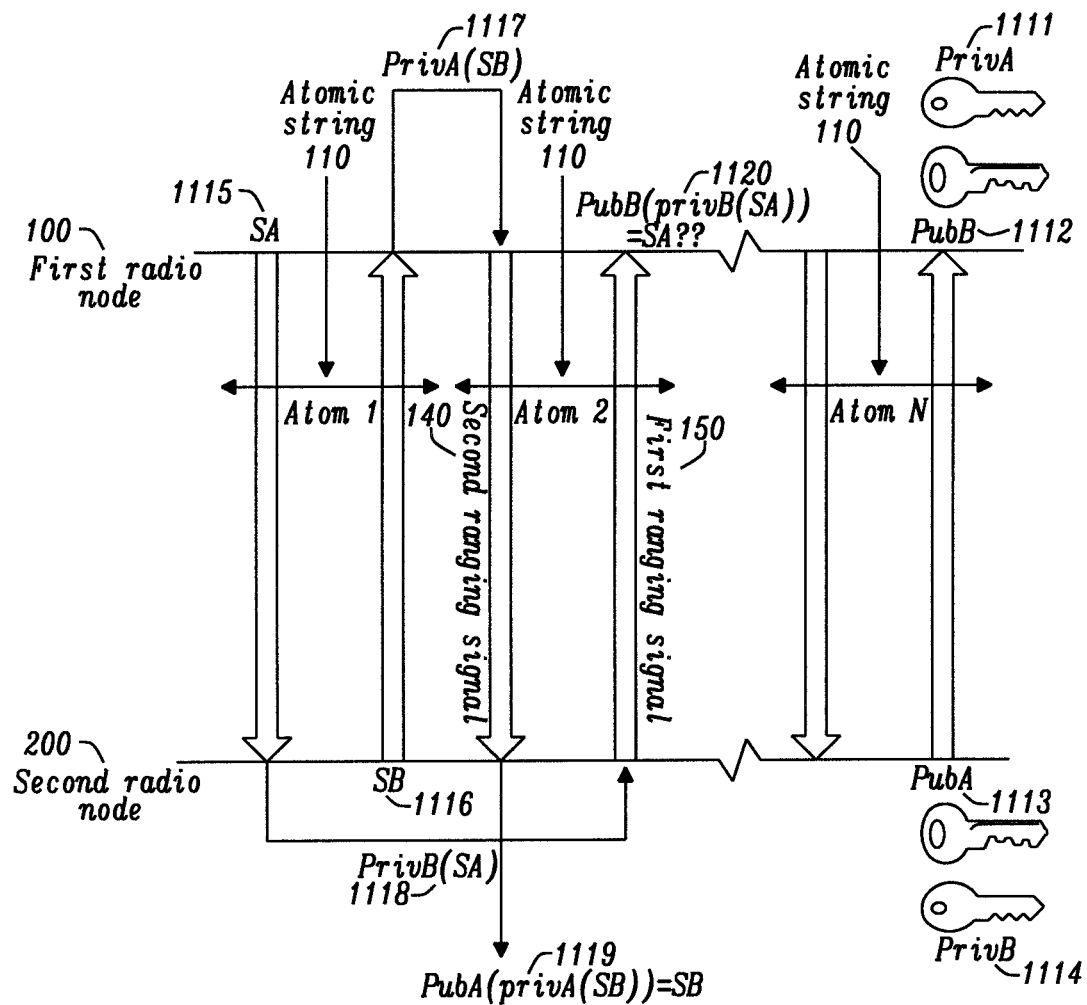
FIG. 11 shows a timing diagram of an exchange of atoms between the first radio node and the second radio node for a modulated carrier based authenticated ToF.

In step 902, the system parameters are determined. The system parameters may include the authentication setup information and a length of atomic string (N). For example, the authentication setup information for a modulated carrier based authenticated ranging measurement method employing public key cryptographic method as the authentication algorithm may comprise a private key of the first radio node 100 (PrivA 1111) and a public key of the communicating second radio node 200 (PubB 1112), as shown in FIG. 11. The PrivA 1111 may be used for encryption of a digital message transmitted by the first radio node 100 and the PubB 1112 may be used for verification of the communicating second radio node 200 by the first radio node 100.

For example, step 902 can involve negotiating between the first radio node 100 and the second radio node 200 about at least part or all of the system parameters to be used, for example, messages can be exchanged about the PubB 1112 of the second radio node 200 that can be used at the first radio node 100 and vice versa. Optionally, the system parameters can be obtained from the data block 105 of the memory 104. For example, PrivA 1111 can be obtained from the data block 105 of the memory 104.

In Step 903 a synchronization packet can be exchanged between the first radio node 100 and the second radio node 200 to tune the transceivers to align the reception and transmission processes, to start both sides with a string of atoms 110. Furthermore, the first radio node 100 may derive a randomly generated digital message, for example, a random seed SA 1115, as shown in FIG. 11. The random seed SA 1115 may be derived from the computing block 106 of the memory 104 based on a random number generation algorithm. The random seed SA 1115 may alternatively be pre-stored in the data block 105 of the memory or obtained from a third party.

As part of the initial synchronization between the first radio node 100 and the second radio node 200, the first radio node 100 may transmit the random seed SA 1115 to second radio node 200 and may further receive another random seed SB 1116 from second radio node 200, as shown in FIG. 11. Alternatively, the random seed SB may be pre-stored in the data block 105 of the memory 104 or obtained from a third party. These transmissions of SA and SB may have the form of ranging signals or any other kind of transmission packets.

Moreover, the controller 103 may be configured to initialize an atom index i to a suitable value, for example 0. Moreover, data element $RxA_0$ may be set to be equal to seed SA and data element $TxA_0$ may be set to be equal to seed SB.

Under the control of the controller 103, the computing block 106 may update the index value i of the atomic string 110 to be the next subsequent value, in step 904.

The first radio node 100 may transmit to the second radio node 200 a second ranging signal 140, as shown in FIG. 11, in Step 905. This second ranging signal 140 can comprise an encrypted digital message 1117. The digital message 1117 may comprise a value that is derived from the previously transmitted value $TxA_{i-1}$, for example by applying a private key of the first radio node 100. This may be represented by the formula $TxA_i=PrivA(TxA_0)$. In the first iteration, when i=0, this amounts to $TxA_1=PrivA(SB)$ in the present example.

In Step 906, the first radio node 100 may receive, using the antenna 101 and the transceiver 102, a first ranging signal 150 from the second radio node 200. The first ranging signal 150 can comprise another encrypted digital message 1118. The controller 103 extracts the encrypted digital message 1118 from the ranging signal and stores in the data block 105 as value $RxA_i$.

In Step 907 under the control of the controller 103 the computing block 106 calculates a first ranging parameter, i.e., a time of arrival TAi and stores the first ranging parameter in the data block 105 of the memory 104.

Under the control of the controller 103, the computing block 106 can authenticate the second radio node 200, in Step 908. The authentication of the second radio node 200, at the first radio node 100, may comprise checking a condition on the extracted message $RxA_i$. For example, the computing block 106 can authenticate the second radio node 200 by applying the public key of the second radio node 200, i.e. PubB 1112, to the encrypted digital message $RxA_i$ comprised in the first ranging signal 150 and check whether the de-encrypted digital message is in agreement with a pre-set value, for example the previous encrypted digital message $RxA_{i-1}$. In that case the condition may be expressed as $PubB(RxA_i)=RxA_{i-1}$. For the first iteration, this amounts to $PubB(RxA_1)=SA$, because $RxA_0=SA$.

If the condition is satisfied in step 908, the controller 103 may further check if the index value i of the current atom in the atomic string 110 is greater than the chosen system parameter value of N, in step 909. If the index of the current atom is less than N, the process repeats step 904 through step 908 until the index value i is greater than N. This way, an atomic string of length N atoms is realized.

If the condition is not satisfied in step 908, controller 103 may be configured to stop the authenticated ranging measurement process and may report an authentication breach, as shown in step 910. For example, the controller 103 may configure the transceiver 102 to transmit to the communicating second radio node 200 a message indicating that the second radio node 200 is not authorized to perform authenticated ranging measurement with the first radio node 100.

If the index value i is greater than N in step 909, the method continues to the next step 911 where the first radio node 100 may transmit the calculated set of first ranging parameters $TA_i$ for all the atoms i, where $i \in \{1, \ldots, N\}$, to the second radio node 200, and receive a set of second ranging parameters, i.e., a set of time of arrival values $TB_i$ calculated at the second radio node 200 for all indexes i of the atom string, where $i \in \{1, \ldots, N\}$.

Under the control of the controller 103 the computing block 106 of the first radio node 100 may then determine a range, in Step 912, based on the set of first ranging parameters and the second ranging parameters. For example, the first ranging parameter and the second ranging parameter (i.e., $TA_i$, $TB_i$) can be averaged for every index value i, where $i \in \{1 \ldots N\}$, to obtain an average range $R_i$ for each atom i, where $i \in \{1 \ldots N\}$. The range can be calculated based on those average values $R_i$. For example, the final range may be determined based on an average of the values Ri, for $i \in \{1, \ldots, N\}$. The method is ended in Step 913.

As an example, all the Steps 901-913 can be performed by the first radio node 100 using a secure wireless communication protocol. Furthermore, the first ranging signal 150 and the second ranging signal 140 can be conveyed using the same direct wireless connection in accordance with a standard wireless communication protocol set up between the first radio node 100 and the second radio node 200. This way there is no interference between the protocol and the ranging signal. The system bandwidth is thus used more efficiently. Also, the implementation of the radio node can be less complex since the ranging signal is transmitted using the standard wireless communications protocol, which may be present to enable other kinds of communications of the radio node. Alternatively, all or a few of the steps can be performed by the first radio node 100 using a non-protocol based direct wireless connection. For example, steps 905 and 906 may be performed out-of-protocol, using a dedicated protocol for ranging signals.

FIG. 10 shows a method for performing authenticated ranging measurement by a second radio node 200, for the modulated carrier based authenticated ToF measurement.

The second radio node 200 starts the method at step 1001. The start may be triggered by an appropriate internal or external signal, or an input provided by a user etc. For example, the method starts when a first radio node 100 tries to set up a communication with the second radio node 200.

In step 1002, the system parameters are determined. The system parameters may include the authentication setup information and a length of atomic string (N). For example, the authentication set up information for a modulated carrier based authenticated ranging measurement method employing public key cryptographic method as the authentication algorithm may comprise a private key of the second radio node 200 (PrivB 1114) and a public key of a communicating first radio node 200 (PubA 1113), as shown in FIG. 11. The PrivB 1114 may be used for encryption of a digital message transmitted by a second radio node 200 and the PubA 1113 may be used for verification of the communicating first radio node 100 by the second radio node 200.

For example, step 1002 can involve negotiating between the second radio node 200 and the first radio node 100 about at least part or all of the system parameters to be used. For example, messages can be exchanged about the PubA 1113 of the first radio node 100 that can be used at the second radio node 200 and vice versa. Optionally, the system parameters can be obtained from the data block 105 of the memory 104. For example, PrivB 1114 can be obtained from the data block 105 of the memory 104.

In Step 1003 a synchronization packet can be exchanged between the second radio node 200 and the first radio node 100 to tune the transceivers to align the reception and transmission processes, to start both sides with a string of atoms 110. Furthermore, the second radio node 200 may derive a randomly generated digital message, for example, a random seed SB 1116. The random seed SB 1116 may be derived from the computing block 106 of the memory 104 based on a random number generation algorithm. The random seed SB 1116 may optionally be also pre-stored in the data block 105 of the memory 104 or be obtained from a third party.

The second radio node 200 may transmit the random seed SB 1116 to first radio node 100 and may further receive another random seed SA 1115 from the first radio node 100. This may be transmitted by means of ranging signals or by means of regular data communication messages. Alternatively, these values SA and/or SB may be received from a trusted third party. In case the random seed is transmitted or received by means of ranging signals, this may be the ranging signals of a first atom of the atomic string in an atomic string having an index i=0. Also in the initialization step 1003, the index value of the current atom may be set to a suitable initial value, such as 0. Under the control of the controller 103, the computing block 106 may then update the index value i of the atomic string 110 to be the next subsequent value, in step 1004.

The second radio node 200 may transmit to the first radio node 100 a first ranging signal 150, as shown in FIG. 11, in step 1005. The first ranging signal 150 can comprise an encrypted digital message 1118 as authentication information. For example, the first ranging signal 150 may comprise an encrypted digital message obtained by applying the private key of the second radio node to the previously transmitted digital message. This may be expressed as $TxB_i=PrivB(TxB_{i-1})$. In case of the first iteration with i=1, this amounts to $TxB_1=PrivB(SA)$, because $TxB_0=SA$.

Thereafter, in step 1006, the second radio node 200 may receive, using the antenna 101 and the transceiver 102, a second ranging signal 140 from the first radio node 100. For example, the second ranging signal 140 can comprise another encrypted digital message 1117, denoted as $RxB_i$.

In Step 1007 under the control of the controller 103 the computing block 106 calculates a second ranging parameter, i.e., a time of arrival TBi, and stores the second ranging parameter in the data block 105 of the memory 104.

Under the control of the controller 103 the computing block 106 can authenticate the first radio node 100, in Step 1008, by testing a condition on the received digital message $RxB_i$, for example by applying the public key of the first radio node, i.e. PubA 1113, to the encrypted digital message 1117 $RxB_i$ comprised in the second ranging signal 140 and check whether the de-encrypted digital message 1119 PubA ($RxB_i$) is in agreement with digital message received by second radio node 200 in the previous atom, i.e., PubA ($RxB_i$)=$RxB_{i-1}$. In the first iteration, this amounts to PubA ($RxB_1$)=SB, because $RxB_0$ is set to SB in step 1003.

If the condition is satisfied in step 1008, the controller 103 may further check if the index value i is greater than the chosen system parameter value of N in step 1009. If the value of i is less than N, the process repeats step 1004 through step 1008 until the value of i is greater than N. This process results in an atomic string of length N.

If the condition is not satisfied in step 1008, controller may be configured to stop the authenticated ranging measurement process and may report an authentication breach, as shown in Step 1010. For example, the control may configure the transceiver 102 to transmit to the communicating first radio node 100 a message indicating that the second radio node 200 is not authorized to perform authenticated ranging measurement with the second radio node 200.

If the value of i is greater than N in step 1009, the method continues to the next step 1011, where the second radio node 200 may transmit the calculated set of second ranging parameters $TB_i$ for all index values i, where $i \in \{1, \ldots, N\}$, to the first radio node 100, and receive a set of first ranging parameters, i.e., a set of time of arrival values $TA_i$ calculated at the second radio node 200 for all index values i, where $i \in \{1, \ldots, N\}$.

Under the control of the controller 103 the computing block 106 of the second radio node 200 may determine a range, in step 1012, based on the set of first ranging parameters $TA_i$ and the set of second ranging parameters $TB_i$. For example, the first ranging parameter and the second ranging parameter (i.e., TAi, TBi) can be averaged for every index value i, to obtain an average range $R_i$ for each atom i, where $i \in \{1, \ldots, N\}$. The range can be calculated based on those average values $R_i$ For example, the final range may be determined based on an average of the values $R_i$, for $i \in \{1, \ldots, N\}$. The method is ended in Step 1013.

As an example, all the Steps 1001-1012 can be performed by the second radio node 200 using a secure wireless communication protocol. Furthermore, the first ranging signal 150 and the second ranging signal 140 can be conveyed using the same direct wireless connection in accordance with a standard wireless communication protocol set up between the first radio node 100 and the second radio node 200. This way there is no interference between the protocol and the ranging signal. The system bandwidth is thus used more efficiently. Also, the implementation of the radio node can be less complex since the ranging signal is transmitted using the standard wireless communications protocol, which may be present to enable other kinds of communications of the radio node. Furthermore, as an example, all or a few of the steps can be performed by the second radio node 200, using a non-protocol based direct wireless connection.

Although the abovementioned description of the second embodiment has been written by disclosing an example where both the first radio node 100 and the second radio 200 may perform authentication of each other, it is also possible that the steps of authentication of a radio node may only be performed by either the first radio node 100 or the second radio node 200, and not by both the radio nodes.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A method for performing authenticated ranging measurement by a first radio node, the method comprising:
   receiving a first ranging signal from a second radio node;
   determining a first ranging parameter based on the first ranging signal;
   determining a range based on the first ranging parameter; and
   authenticating the second radio node based on the first ranging signal and authentication setup information comprising a condition on the first ranging signal,
   wherein the first ranging signal is used at the first radio node for both determining the first ranging parameter and authenticating the second radio node, and wherein the first ranging signal is received at the first radio node in a single direct wireless connection in accordance with a standard wireless communications protocol set up between the first radio node and the second radio node.

2. The method of claim 1, further comprising
   transmitting a second ranging signal to the second radio node;
   receiving information indicating a second ranging parameter based on the second ranging signal from the second radio node;
   wherein the determining the range is based on the first ranging parameter and the second ranging parameter.

3. The method of claim 2, further comprising
   determining authentication information based on the authentication setup information;
   wherein the transmitted second ranging signal represents the authentication information.

4. The method of claim 1, further comprising
   communicating at least part of the authentication setup information between the first radio node and the second radio node using a secure communication protocol.

5. The method according claim 1, wherein the authentication setup information comprises a shared secret or a public key.

6. The method according to claim 1, wherein authenticating the second radio node comprises:
   computing a value based on the received first ranging signal and the authentication setup information;
   determining if the condition is satisfied based on the computed value; and
   authenticating the second radio node if the condition is satisfied.

7. The method according to claim 1, further comprising
   extracting a digital message comprised in the received first ranging signal;
   wherein the condition on the first ranging signal comprises a condition on the digital message.

8. The method of claim 7, further comprising:
   transmitting a challenge to the second radio node;
   receiving the first ranging signal as a response to the challenge from the second radio node;
   determining if the condition is satisfied based on the response to the challenge and a cryptographic key; and
   if the condition is satisfied, authenticating the second radio node.

9. The method of claim 5, wherein the second ranging signal is conveyed in a direct wireless connection in accordance with a standard wireless communications protocol set up between the first radio node and the second radio node.

10. The method of claim 1, wherein the receiving the first ranging signal comprises:
    determining at least one channel parameter of a communications channel based on the authentication setup information;
    listening to the communications channel having the channel parameter; and
    receiving the first ranging signal in the channel having the channel parameter.

11. The method of claim 10, wherein the channel parameter comprises a radio frequency.

12. The method of claim 10, comprising tuning to a plurality of communications channels according to a sequence of channel parameters and receiving the first ranging signal in each of the plurality of communications channels.

13. The method of claim 12, wherein authenticating the second radio node comprises authenticating the second radio node if the first ranging signal has been successfully received on a certain sufficient number of the plurality of communications channels.

14. The method of claim 12,
    wherein the authentication setup information comprises at least one of an initial channel parameter and a cryptographic key, and
    further comprising computing the sequence of channel parameters based on the initial channel parameter or the cryptographic key.

15. The method of claim 2, comprising transmitting a plurality of the second ranging signal to the second radio node and receiving a plurality of the first ranging signal from the second radio node,
    wherein the determining the range is based on the plurality of the first ranging signals and authenticating the second radio node is based on the plurality of the first ranging signals.

16. The method of claim 15
    wherein the determining the range comprises analyzing the plurality of received first ranging signals; and
    wherein the authenticating the second radio node comprises determining an indication of a certainty of the determined range.

17. The method of claim 16, wherein the first ranging parameter and the second ranging parameter comprises at least one of a time of arrival and a phase.

18. A method for performing authenticated ranging measurement by a second radio node, the method comprising:
    determining authentication information based on an authentication setup information; and
    transmitting a first ranging signal to a first radio node, the first ranging signal representing the authentication information,
    wherein the first ranging signal is used at the first radio node for both determining a first ranging parameter and authenticating the second radio node, and wherein the first ranging signal is transmitted by the second radio node in a single direct wireless connection in accordance with a standard wireless communications protocol set up between the first radio node and the second radio node.

19. The method of claim 18, further comprising:
communicating at least part of the authentication setup information between the first radio node and the second radio node using a secure communication protocol.

20. The method of claim 18, wherein the authentication setup information includes a shared secret or a private key.

21. The method of claim 18, wherein the authentication information comprises a digital message, and the first ranging signal comprises the digital message.

22. The method of claim 21, further comprising:
receiving a challenge comprising a digital message; and
computing a response to the challenge, the response comprising a digital message, based on the challenge and a cryptographic key,
wherein the authentication information comprises the response to the challenge.

23. The method of claim 18, wherein the transmitting the first ranging signal comprises:
determining at least one channel parameter of a communications channel based on the authentication setup information; and
transmitting the first ranging signal in the channel of the channel parameter.

24. The method of claim 23, wherein the channel parameter comprises a radio frequency.

25. The method of claim 23, comprising tuning to a plurality of communications channels according to a sequence of channel parameters and transmitting the first ranging signal in each of the plurality of communications channels.

26. The method of claim 3,
wherein the authentication setup information comprises at least one of an initial channel parameter and a cryptographic key, and
further comprising computing the sequence of channel parameters based on the initial channel parameter or the cryptographic key.

27. A first radio node for performing authenticated ranging measurement, comprising:
a transceiver configured to receive a first ranging signal from a second radio node; and
a controller configured to determine a first ranging parameter based on the first ranging signal, to determine a range based on the first ranging parameter, and to authenticate the second radio node based on the first ranging signal and authentication setup information comprising a condition on the first ranging signal,
wherein the first ranging signal is configured to be used at the first radio node for both to determine the first ranging parameter and to authenticate the second radio node, and wherein the first ranging signal is received at the first radio node in a single direct wireless connection in accordance with a standard wireless communications protocol set up between the first radio node and the second radio node.

28. The first radio node of claim 27,
wherein the transceiver is configured to transmit a second ranging signal to a second radio node,
wherein the controller is configured to receive information indicating a second ranging parameter based on the second ranging signal from the second radio node, and
wherein the controller is further configured to determine a range based on the first ranging parameter and the second ranging parameter.

29. The first radio node of claim 28, wherein the controller is further configured to determine authentication information based on the authentication setup information,
wherein the transmitted second ranging signal represents the authentication information.

30. The first radio node of claim 27, wherein the transceiver is further configured to communicate at least part of the authentication setup information between the first radio node and the second radio node using a secure communication protocol.

31. The first radio node of claim 27, wherein the authentication setup information comprises a shared secret or a public key.

32. The first radio node of claim 27, wherein the controller is further configured to:
compute a value based on the received first ranging signal and the authentication setup information;
determine if the condition is satisfied based on the computed value; and
authenticate the second radio node if the condition is satisfied.

33. The first radio node of claim 27,
wherein the controller is further configured to extract a digital message comprised in the received first ranging signal; and
wherein the condition on the first ranging signal comprises a condition on the digital message.

34. The first radio node of claim 33, wherein the controller is further configured to:
transmit a challenge to the second radio node;
receive the first ranging signal as a response to the challenge from the second radio node;
determine if the condition is satisfied based on the response to the challenge and a cryptographic key; and
if the condition is satisfied, authenticate the second radio node.

35. The first radio node of claim 28, wherein the second ranging signal is conveyed in a direct wireless connection in accordance with a standard wireless communications protocol set up between the first radio node and the second radio node.

36. The first radio node of claim 27, wherein the controller is configured to:
determine at least one channel parameter of a communications channel based on the authentication setup information;
control the transceiver to listen to the communications channel having the channel parameter and receive the first ranging signal in the channel having the channel parameter.

37. The first radio node of claim 36, wherein the channel parameter comprises a radio frequency.

38. The first radio node of claim 37, wherein the controller is further configured to control the transceiver to tune to a plurality of communications channels according to a sequence of channel parameters and receive the first ranging signal in each of the plurality of communications channels.

39. The first radio node of claim 38, wherein the controller is further configured to authenticate the second radio node if the first ranging signal has been successfully received on a certain sufficient number of the plurality of communications channels.

40. The first radio node of claim 38,
wherein the authentication setup information comprises at least one of an initial channel parameter and a cryptographic key, and wherein the controller is further configured to compute the sequence of channel parameters based on the initial channel parameter and the cryptographic key.

41. The first radio node of claim 38,
wherein the controller is further configured to calculate the range by analyzing the plurality of received first ranging signals, and authenticate the second radio node by determining an indication of a certainty of the calculated range.

42. The first radio node of claim 27, wherein the controller is further configured to:
control the transceiver to transmit a plurality of the second ranging signal to the second radio node and receive a plurality of the first ranging signal from the second radio node,
determine the range based on the plurality of the first ranging signals, and
authenticate the second radio node based on the plurality of the first ranging signals.

43. The first radio node of claim 42, wherein the first ranging parameter and the second ranging parameter comprise at least one of time of arrival and phase.

44. A second radio node for performing authenticated ranging measurement, comprising:
a controller configured to determine authentication information based on authentication setup information; and
a transceiver configured to transmit a first ranging signal to a first radio node, the first ranging signal representing the authentication information,
wherein the first ranging signal is configured to be used at the first radio node for both to determine a first ranging parameter and to authenticate the second radio node, and wherein the first ranging signal is transmitted by the second radio node in a single direct wireless connection in accordance with a standard wireless communications protocol set up between the first radio node and the second radio node.

45. The second radio node of claim 44, wherein the controller is further configured to control the transceiver to communicate at least part of the authentication setup information between the first radio node and the second radio node using a secure communication protocol.

46. The second radio node of claim 44, wherein the authentication setup information includes a shared secret or a private key.

47. The second radio node of claim 44, wherein the authentication information comprises a digital message, and the first ranging signal comprises the digital message.

48. The second radio node of claim 47, wherein the controller is further configured to:
receive a challenge comprising a digital message; and
compute an encrypted digital message based on the digital message and a cryptographic key,
wherein the authentication information comprises the encrypted digital message.

49. The second radio node of claim 44, wherein the controller is further configured to:
determine at least one channel parameter of a communications channel based on the authentication setup information; and
control the transceiver to transmit the first ranging signal in the channel of the channel parameter.

50. The second radio node of claim 49, wherein the channel parameter comprises a radio frequency.

51. The second radio node of claim 49, wherein the controller is further configured to control the transceiver to tune to a plurality of communications channels according to a sequence of channel parameters and transmit the first ranging signal in each of the plurality of communications channels.

52. The second radio node of claim 49,
wherein the authentication setup information comprises at least one of an initial channel parameter and a cryptographic key, and
wherein the controller is further configured to compute the sequence of channel parameters based on the initial channel parameter and the cryptographic key.

* * * * *